(12) United States Patent
Okuno et al.

(10) Patent No.: US 11,513,433 B2
(45) Date of Patent: Nov. 29, 2022

(54) LIGHTING DEVICE AND PROJECTION DISPLAY APPARATUS

(71) Applicant: Panasonic Intellectual Property Management Co., Ltd., Osaka (JP)

(72) Inventors: Manabu Okuno, Osaka (JP); Yoshimasa Fushimi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/078,512

(22) Filed: Oct. 23, 2020

(65) Prior Publication Data

US 2021/0124250 A1 Apr. 29, 2021

(30) Foreign Application Priority Data

Oct. 25, 2019 (JP) .............................. JP2019-194429

(51) Int. Cl.
*G03B 21/20* (2006.01)
*G03B 21/00* (2006.01)
*G02B 5/04* (2006.01)

(52) U.S. Cl.
CPC ........... *G03B 21/2066* (2013.01); *G02B 5/04* (2013.01); *G03B 21/008* (2013.01)

(58) Field of Classification Search
CPC ................ G03B 21/005; G03B 21/008; G03B 21/2033; G03B 21/204; G03B 21/2066; G03B 21/2073
See application file for complete search history.

(56) References Cited

U.S. PATENT DOCUMENTS

| | | | | |
|---|---|---|---|---|
| 6,185,047 B1* | 2/2001 | Peterson | .............. | H04N 9/3114 348/E5.142 |
| 6,421,507 B1* | 7/2002 | Heemstra | .............. | H01J 9/2273 396/546 |
| 6,556,256 B1* | 4/2003 | Kato | .................... | H04N 9/3114 359/833 |
| 6,880,935 B1* | 4/2005 | Dewald | ................ | G03B 21/208 348/E9.027 |

(Continued)

FOREIGN PATENT DOCUMENTS

| | | | | |
|---|---|---|---|---|
| JP | 2000330073 A | * 11/2000 | ............. | G02F 27/18 |
| JP | 2002-542585 | 12/2002 | | |

(Continued)

*Primary Examiner* — Magda Cruz (74) *Attorney, Agent, or Firm* — Wenderoth, Lind & Ponack, L.L.P.

(57) ABSTRACT

A lighting device of the present disclosure includes a light source device and a reflective component. The reflective component reflects an illumination light incident from the light source device off the reflecting surface of the reflective component at incident angle α, and emits the illumination light reflected toward a display element at exit angle β. The reflecting surface of the reflective component is rotated with respect to two axes orthogonal to each other. 20 degrees≤|α−β|≤60 degrees is satisfied. Where, each of the incident angle α and the exit angle β is angle of the illumination light to a horizontal direction of the display element when the illumination light is incident on a front surface of the display element.

8 Claims, 11 Drawing Sheets

(56) References Cited

U.S. PATENT DOCUMENTS

| | | | | |
|---|---|---|---|---|
| 2002/0180934 A1* | 12/2002 | Shimizu | ............... | H04N 9/3141 353/30 |
| 2005/0168708 A1* | 8/2005 | Huang | ................. | H04N 9/3105 353/81 |
| 2005/0280779 A1* | 12/2005 | Shimizu | ............... | G03B 21/005 353/33 |
| 2008/0084545 A1* | 4/2008 | Chen | ...................... | G03B 21/28 353/33 |
| 2009/0262311 A1* | 10/2009 | Lin | ...................... | G02B 17/045 353/81 |
| 2017/0142378 A1 | 5/2017 | Terada | | |
| 2019/0011813 A1* | 1/2019 | Sawai | ................ | G02B 27/0955 |
| 2019/0258145 A1* | 8/2019 | Sawai | ................... | G03B 21/28 |

FOREIGN PATENT DOCUMENTS

| | | |
|---|---|---|
| JP | 2009-175539 | 8/2009 |
| WO | 00/63941 | 10/2000 |
| WO | 2015/194454 | 12/2015 |

* cited by examiner

LIGHTING DEVICE AND PROJECTION DISPLAY APPARATUS

BACKGROUND

1. Technical Field

The present disclosure relates to a lighting device used for a projection display apparatus, such as a projector, and to a projection display apparatus including the lighting device.

2. Description of the Related Art

Patent literature (PLT) 1 discloses a lighting optical system using a digital micromirror device (hereinafter, referred to as a DMD) that acts about two axes orthogonal to each other; and a projection display apparatus. In this conventional example, in order to have illumination light vertically enter the DMD by means of a display element, a triangular prism is vertically disposed, and one plane of the prism is inclined only in one axis direction to reflect illumination light, for example.

PTL 1 is International Publication No. WO 2015/194454.

SUMMARY

In the device configuration of the conventional example, however, downsizing is almost impossible.

An object of the present disclosure is to provide a lighting device and a projection display apparatus including the lighting device. The lighting device can be downsized compared to the conventional example without decreasing the use efficiency of illumination light when a component is used that changes the direction of illumination light incident on the display element.

A lighting device of the present disclosure includes a light source device and a reflective component. The reflective component reflects an illumination light incident from the light source device off the reflecting surface of the reflective component at incident angle $\alpha$, and emits the illumination light reflected toward a display element at exit angle $\beta$. The reflecting surface of the reflective component is rotated with respect to two axes orthogonal to each other. 20 degrees$\leq |\alpha-\beta| \leq$60 degrees is satisfied. Where, each of the incident angle $\alpha$ and the exit angle $\beta$ is angle of the illumination light to a horizontal direction of the display element when the illumination light is incident on a front surface of the display element.

A lighting device of the present disclosure, when changing the direction of light using a reflective component with its reflecting surface rotated with respect to two axes orthogonal to each other, allows downsizing the device as compared to the conventional example without decreasing the use efficiency of light from the lighting device.

DETAILED DESCRIPTION OF PREFERRED EMBODIMENTS

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure, and it is not intended that the drawings and the description limit the subjects described in the claims. An identical or similar component is given the same reference number.

First Exemplary Embodiment

Hereinafter, the first exemplary embodiment is described using FIGS. 1 through 6D.

1-1. Description of Configuration 1-1-1. Overall Configuration

Figure 1:
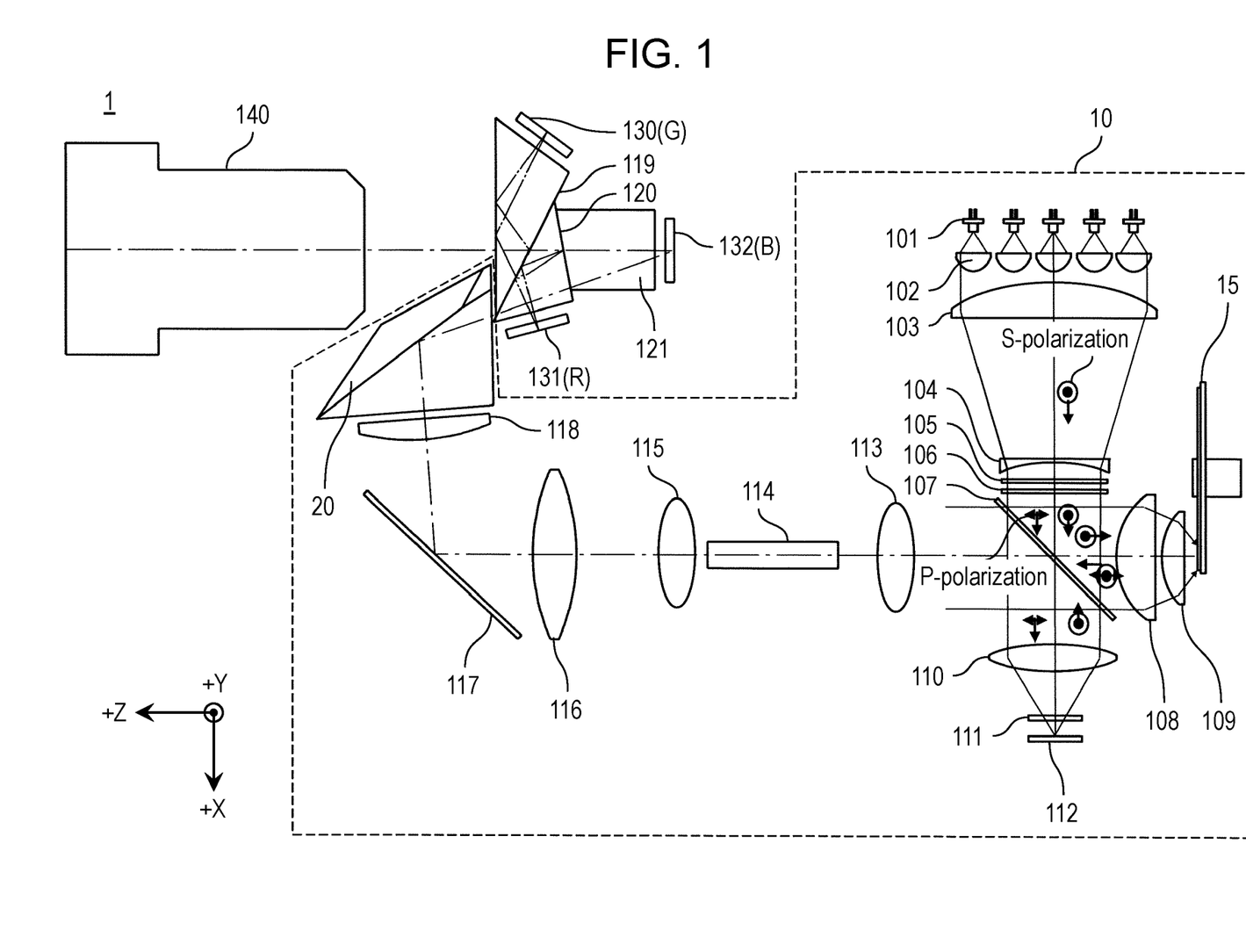
FIG. 1 is a block diagram illustrating an example configuration of projection display apparatus 1 including lighting device 10 of the first exemplary embodiment.

FIG. 1 is a block diagram illustrating an example configuration of the optical system of projection display apparatus 1 including lighting device 10 of the first exemplary embodiment. For convenience in the following description, an XYZ rectangular coordinate system (shown in FIG. 1) is used in FIG. 1.

First, a description is made of the light source optical system of projection display apparatus 1.

In FIG. 1, laser light source 101 (i.e., an excitation light source) is formed of blue semiconductor lasers that emit blue light with a wavelength width from 447 nm to 462 nm and emit linearly polarized light. To implement a high-luminance lighting device, laser light source 101 is composed of multiple semiconductor lasers. In FIG. 1, five blue semiconductor lasers are placed side by side for exemplification, while actually multiple blue semiconductor lasers are arranged on a flat plane in a matrix. In FIG. 1, blue semiconductor lasers are arranged in s-polarization for exemplification, where the polarizing direction of the blue semiconductor lasers is a Y axis direction.

Laser light (i.e., excitation light) emitted from each of laser light sources 101 composing a light source device is collimated by corresponding collimate lens 102. Light emitted from collimate lens 102 is substantially parallel light. The entire light flux of this parallel light is condensed by lens 103 and is changed to substantially parallel light again by lens 104. The laser light flux changed to substantially parallel light by lens 104 passes through diffusion plate 105 and is incident on quarter wavelength plate 106 that is rotated at a given angle to the X axis. Here, the laser light is changed to elliptically polarized light by quarter wavelength plate 106 and enters dichroic mirror 107 disposed at approximately 45° to the optical axis. Diffusion plate 105 is a glass plain plate, and its one surface has a diffusion surface on which fine asperities are formed.

Figure 3:
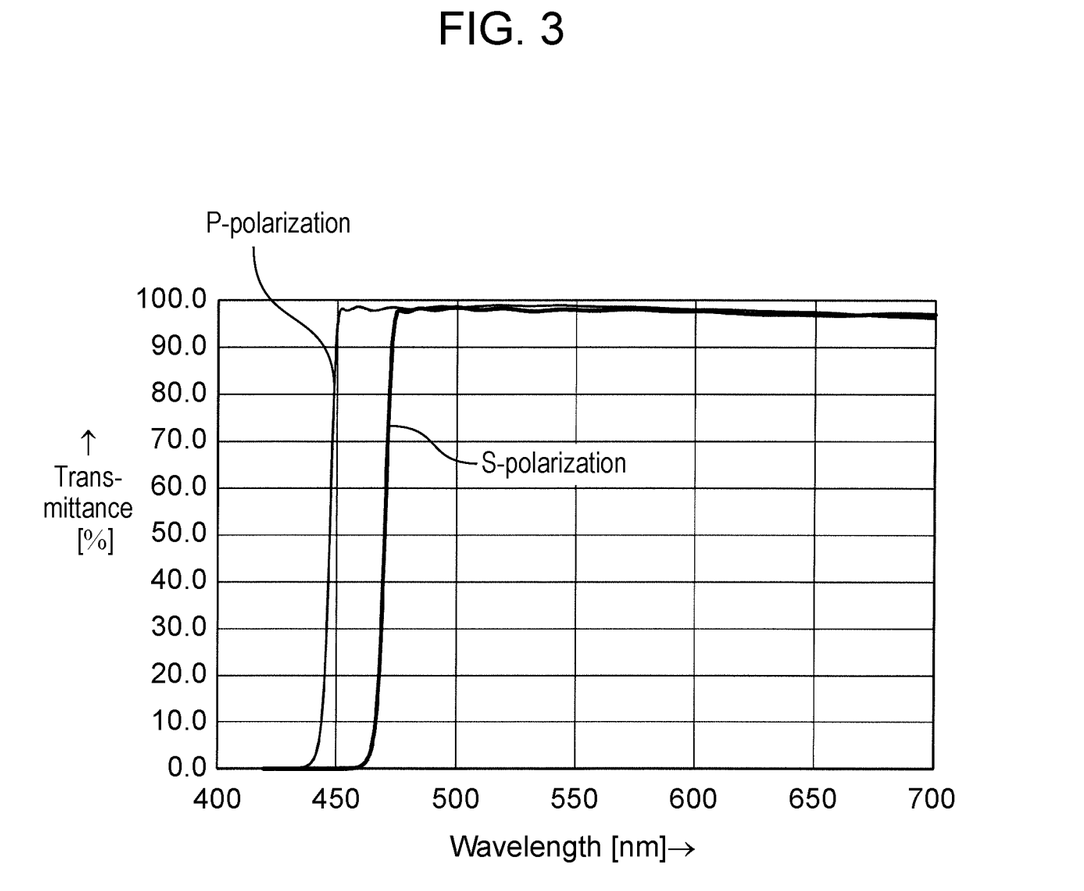
FIG. 3 is a graph illustrating the spectral transmittance of dichroic mirror 107 in FIG. 1.

FIG. 3 is a graph illustrating the spectral transmittance of dichroic mirror 107 in FIG. 1. As is clear from FIG. 3, dichroic mirror 107 transmits or reflects blue light with a characteristic of 465-nm wavelength at which the transmittance is 50% for s-polarization; and of 442 nm for p-polarization. Dichroic mirror 107 has a characteristic in which 96% or more color light containing green and red components is transmitted.

Of laser light that has entered dichroic mirror 107 in the −X direction, the s-polarized component is reflected off dichroic mirror 107, and then is emitted in the −Z direction. Meanwhile, the p-polarized component is transmitted through dichroic mirror 107 and is emitted in the −X direction. Laser light that has been emitted in the −Z direction is condensed by lenses 108 and 109 and excites a phosphor formed in phosphor wheel device 15.

Figure 2A:
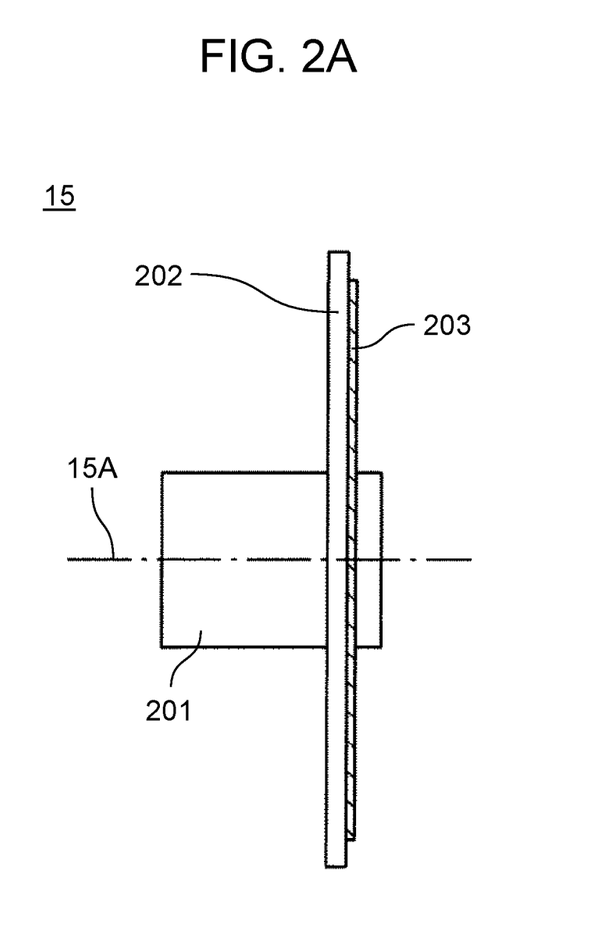
FIG. 2A is a side view of an example configuration of phosphor wheel device 15 in FIG. 1.
Figure 2B:
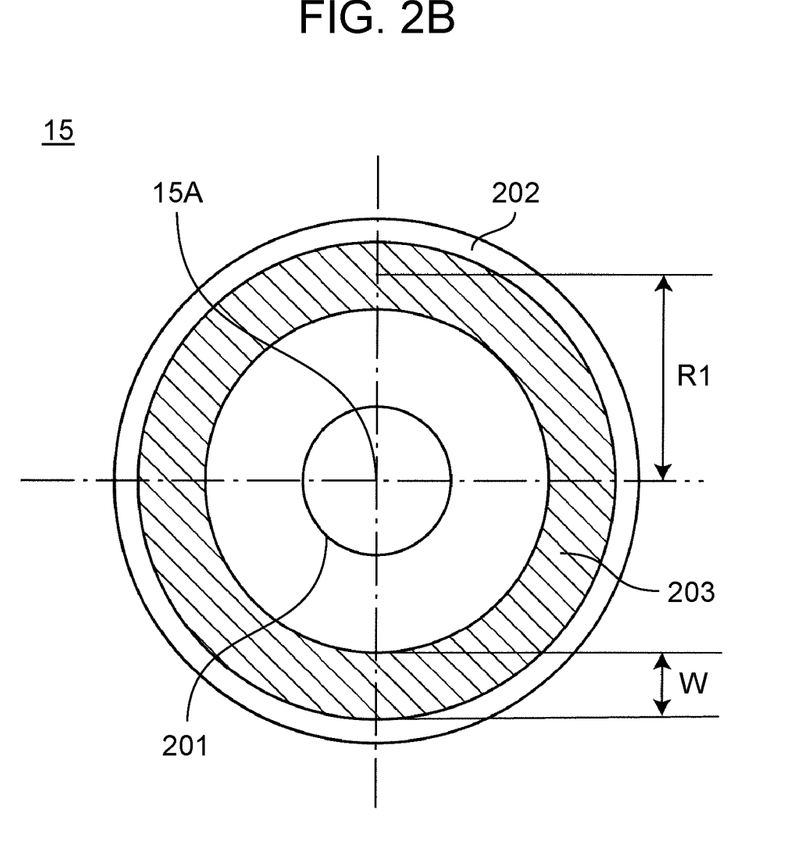
FIG. 2B is a front view of phosphor wheel device 15 of FIG. 2A.

FIG. 2A is a side view of an example configuration of phosphor wheel device 15 in FIG. 1. FIG. 2B is a front view of phosphor wheel device 15 of FIG. 2A. Phosphor wheel device 15, as shown in the side view of FIG. 2A, includes motor 201; and rotation base material 202 that is disk-shaped and is rotatably driven with rotation axis center 15A of motor 201 as the center. Rotation base material 202, as shown in the front view of FIG. 2B, has yellow phosphor 203 of given width W formed inside and outside a circumference at distance R1 from rotation axis center 15A of phosphor wheel device 15. Here, when laser light from laser light source 101 is condensed and enters yellow phosphor 203 of phosphor wheel device 15, yellow phosphor 203 is excited to emit yellow light.

Referring back to FIG. 1, yellow light produced from phosphor wheel device 15 is emitted from phosphor wheel device 15 in the +Z direction. Phosphor light emitted from yellow phosphor 203 in the −Z direction is reflected off rotation base material 202 and is emitted in the +Z direction. The yellow light is collimated by lenses 109 and 108 and is transmitted through dichroic mirror 107.

Meanwhile, p-polarized light of blue light from the blue semiconductor laser that has passed through dichroic mirror 107 is condensed by lens 110, is transmitted through quarter wavelength plate 111 to be circularly polarized light, is reflected off reflection mirror 112 disposed near the focal point of lens 110, again is transmitted through quarter wavelength plate 111 to be s-polarized light, then is changed to substantially parallel light by lens 110, and is reflected off dichroic mirror 107.

In this way, yellow light from phosphor wheel device 15 and blue light reflected off reflection mirror 112 is synthesized by dichroic mirror 107, is emitted as white light, and is condensed by condenser lens 113 to enter rod integrator 114.

Light emitted from rod integrator 114 passes through lens 115, lens 116, mirror 117, and lens 118, and enters prism 20 in a substantially triangular prism shape, and then is separated by color by prisms 119, 120, and 121. The incident light is modulated by DMDs 130, 131, and 132 (light modulation element parts of light modulation element corresponding to a corresponding one of the plurality of wavelengths) according to image signals, is emitted as image light P, is again synthesized by color by prisms 119, 120, and 121, and is made enter projection lens 140. The outgoing light from projection lens 140 is enlarge-projected as image light P on a screen. Note that DMDs 130, 131, and 132 make illumination light reflect off a mirror forming each pixel.

1-1-2. Configuration of Main Part

Hereinafter, a description is made of the configuration of the main part according to the first exemplary embodiment in reference to FIGS. 4A through 6D. In FIGS. 4A through 6D, the X, Y, and Z axes are orthogonal to each other, where the plane containing the X and Y axes is referred to as the XY plane; the Y and Z axes, the YZ plane; and the Z and X axes, the ZX plane.

Figure 4A:
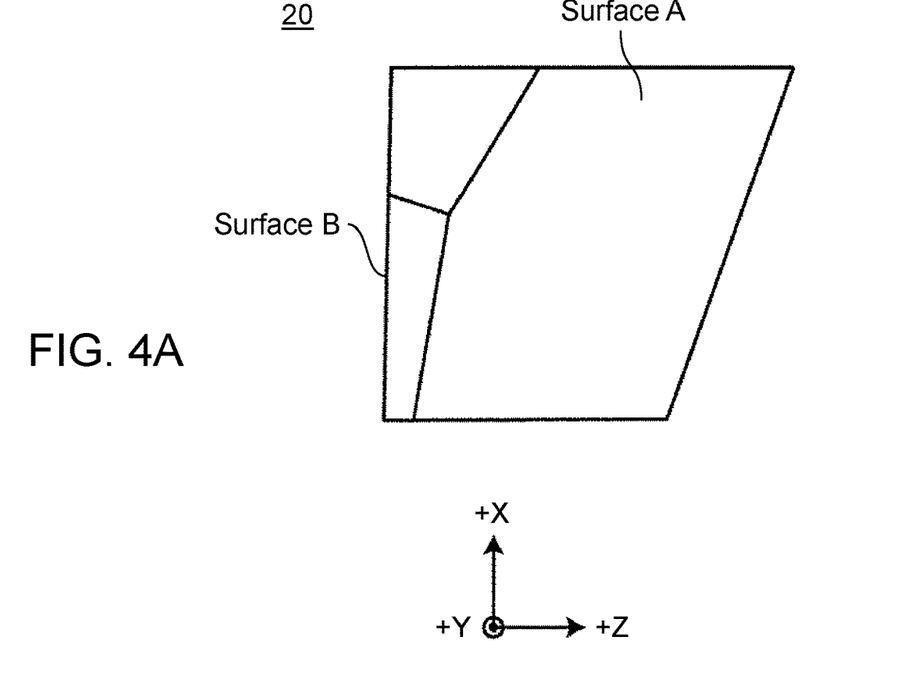
FIG. 4A is a front view from the ZX plane, of an example configuration of prism 20 in FIG. 1.
Figure 4B:
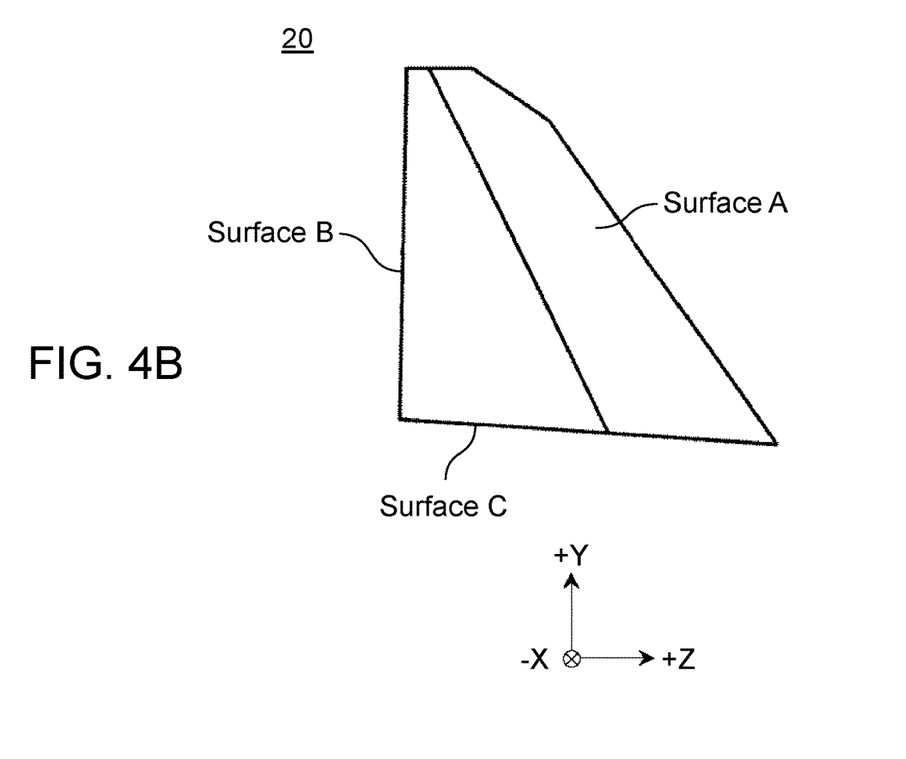
FIG. 4B is a front view from the YZ plane, of the example configuration of prism 20 in FIG. 1.
Figure 5A:
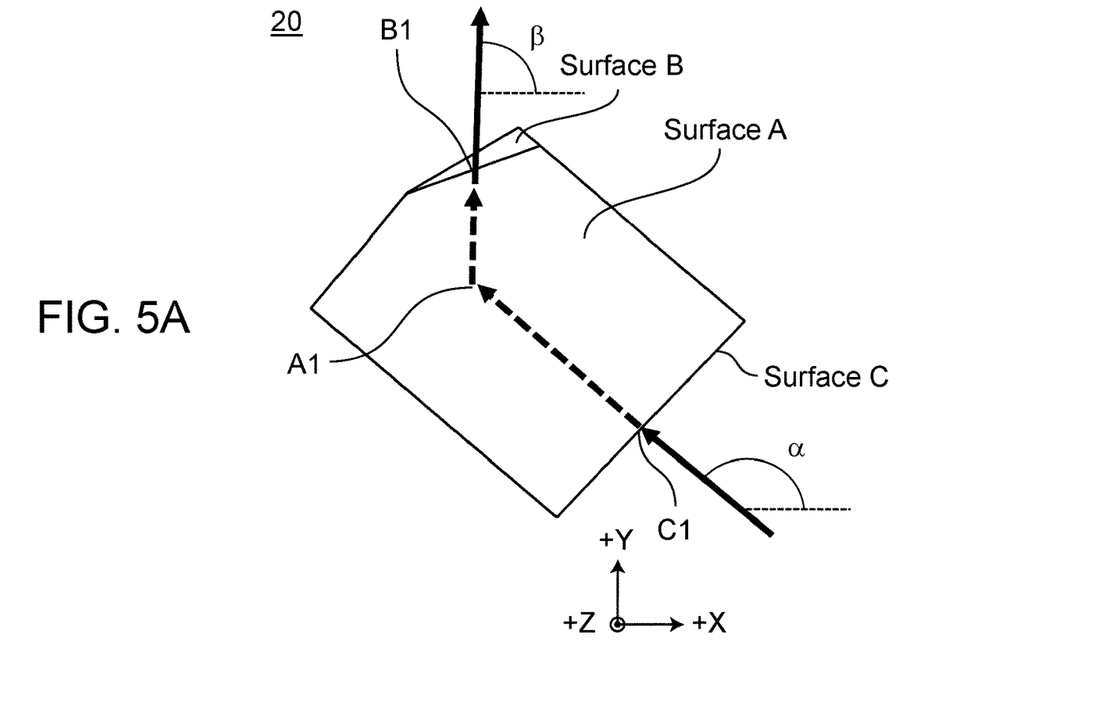
FIG. 5A is a front view from the XY plane, showing incident angle $\alpha$ and exit angle $\beta$ to and from prism 20 of FIGS. 4A and 4B.
Figure 5B:
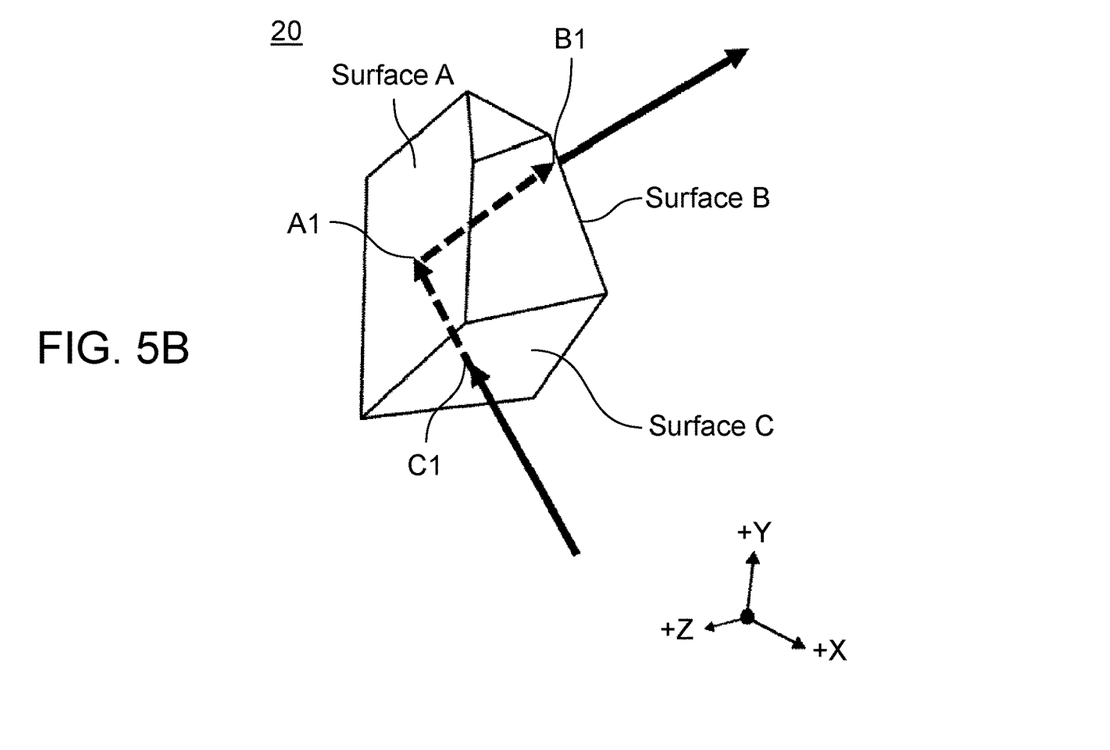
FIG. 5B is a perspective view, showing incident angle $\alpha$ and exit angle $\beta$ to and from prism 20 of FIGS. 4A and 4B.

FIG. 4A is a front view from the ZX plane, showing an example configuration of prism 20 in FIG. 1. FIG. 4B is a front view from the YZ plane, showing the example configuration of prism 20 in FIG. 1. FIG. 5A is a front view from the XY plane, showing incident angle α and exit angle β to and from prism 20 of FIGS. 4A and 4B. FIG. 5B is a perspective view, showing incident angle α and exit angle β to and from prism 20 of FIGS. 4A and 4B. FIGS. 6A through 6D illustrate various actions of prism 20 of FIGS. 4A and 4B, which are as follows.

Figure 6A:
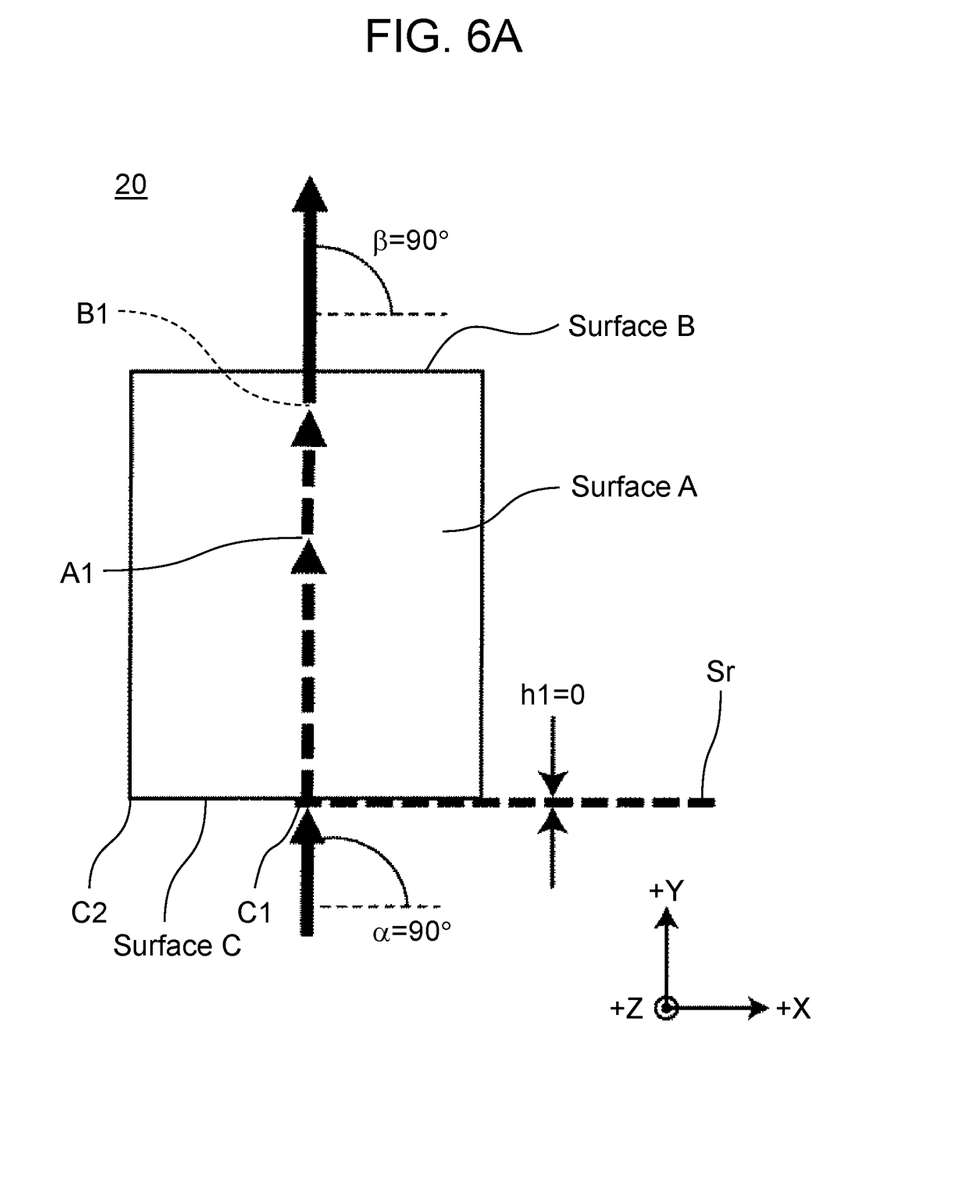
FIG. 6A is a front view of the XY plane at incident angle $\alpha=90°$ and exit angle $\beta=90°$ to and from prism 20 of FIGS. 4A and 4B.

(1) FIG. 6A is a front view of the XY plane at incident angle α=90° and exit angle β=90° to and from prism 20 of FIGS. 4A and 4B.

Figure 6B:
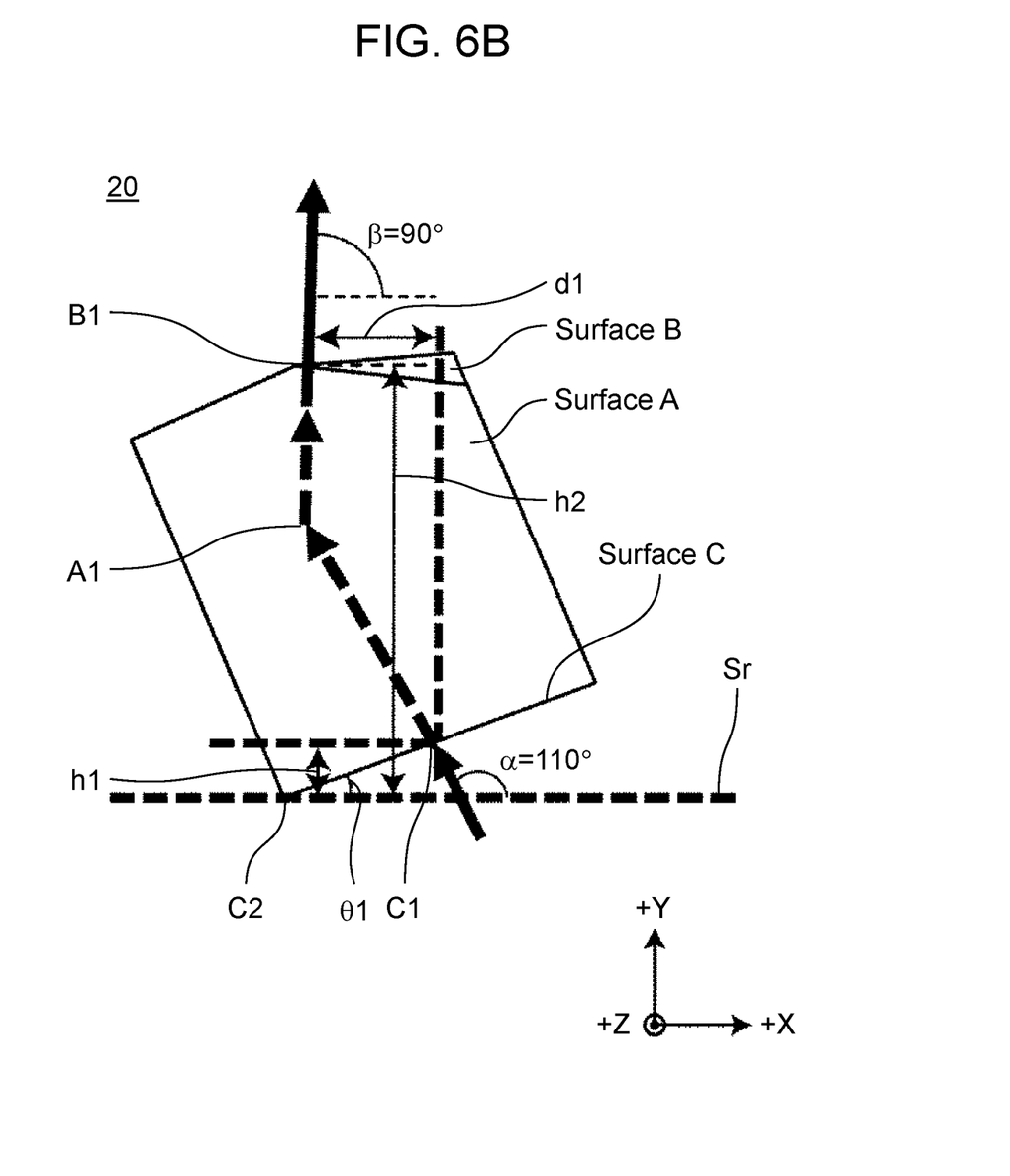
FIG. 6B is a front view of the XY plane at incident angle $\alpha=110°$ and exit angle $\beta=90°$ to and from prism 20 of FIGS. 4A and 4B.

(2) FIG. 6B is a front view of the XY plane at incident angle α=110° and exit angle β=90° to and from prism 20 of FIGS. 4A and 4B.

Figure 6C:
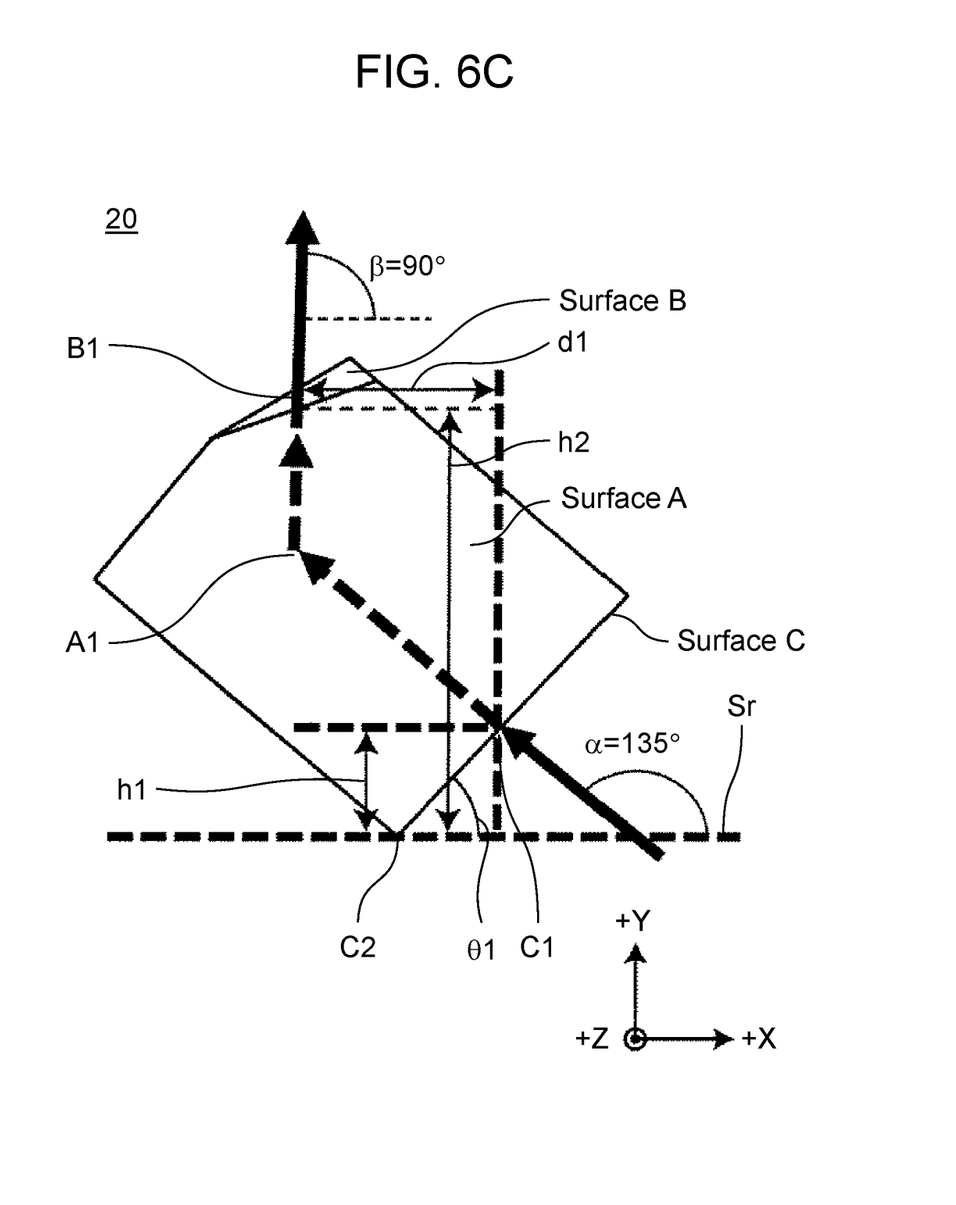
FIG. 6C is a front view of the XY plane at incident angle $\alpha=135°$ and exit angle $\beta=90°$ to and from prism 20 of FIGS. 4A and 4B.

(3) FIG. 6C is a front view of the XY plane at incident angle α=135° and exit angle β=90° to and from prism 20 of FIGS. 4A and 4B.

Figure 6D:
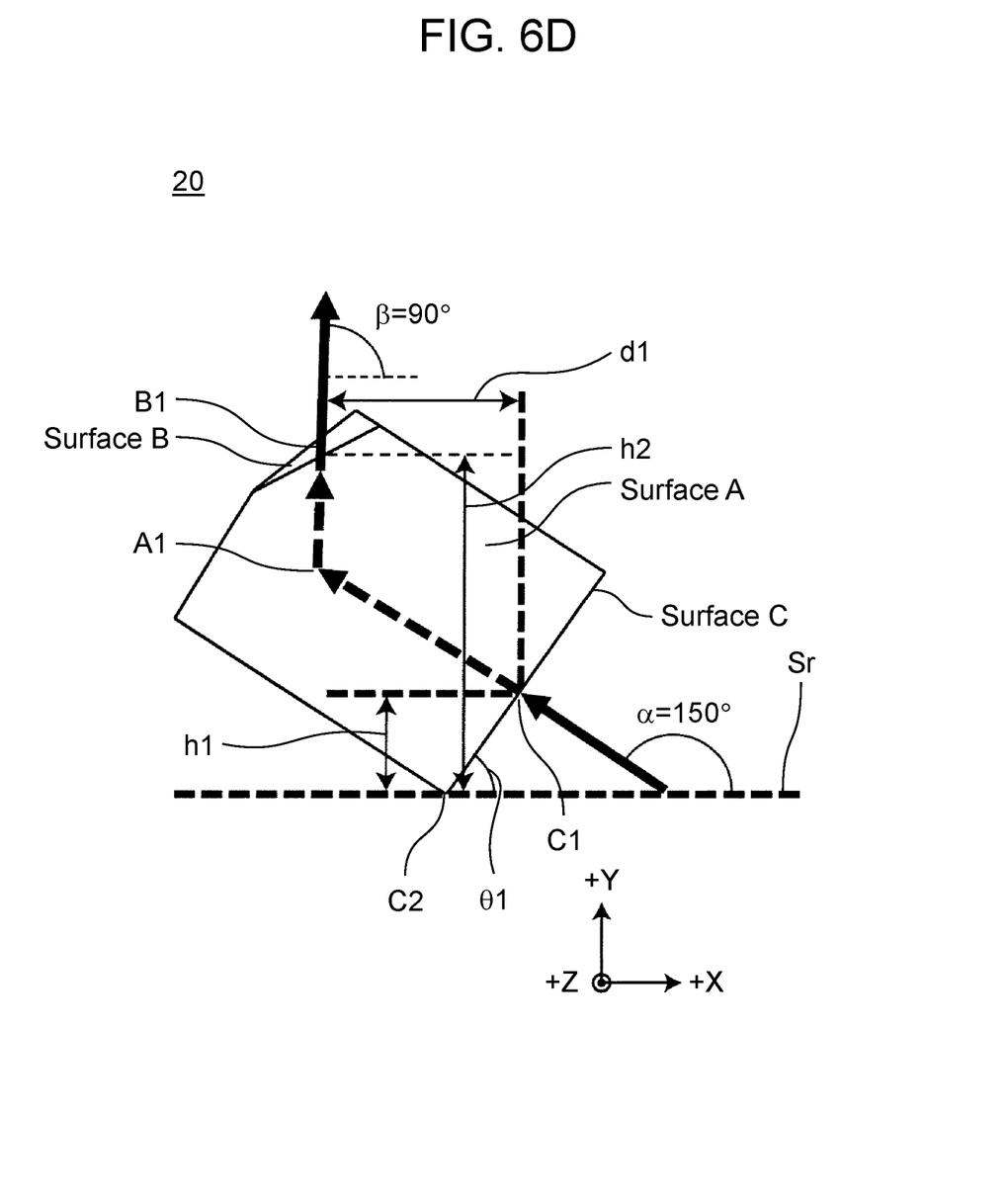
FIG. 6D is a front view of the XY plane at incident angle $\alpha=150°$ and exit angle $\beta=90°$ to and from prism 20 of FIGS. 4A and 4B.

(4) FIG. 6D is a front view of the XY plane at incident angle α=150° and exit angle β=90° to and from prism 20 of FIGS. 4A and 4B.

Next, a description is made of effects of prism 20 in reference to FIGS. 4A through 6D.

As shown in FIGS. 4A and 4B, surfaces A, B, and C of prism 20 are configured as follows.

(1) Surface A is formed by rotating a plane parallel with the ZX plane by respective given angles to the X axis and to the Y axis.

(2) Surface B is parallel with the XY plane.

(3) Surface C is formed by rotating a plane parallel with the ZX plane by a given angle to the X axis.

As shown in FIGS. 5A and 5B, the following actions are seen in prism 20 with the above-described surfaces A, B, and C when the XY plane is viewed from the Z axis direction. Illumination light from lens 118 enters incident point C1 (an approximately central part of surface C) in the normal line direction of surface C of prism 20 at incident angle α to the X axis, and then reflects off reflection point A1 of surface A. Subsequently, the illumination light reflected is emitted from emission point B1 of surface B in the direction orthogonal to surface B at exit angle β to the X axis. Here, each of incident angle α and exit angle β is an angle of the illumination light to the horizontal direction (the X axis direction) of DMDs 130, 131, and 132 when the illumination light is incident on the front surfaces of DMDs 130, 131, and 132. Surfaces A, B, and C respectively correspond to the reflecting surface, exit surface, and incident surface.

As shown in FIG. 6A, surface C of prism 20 is disposed on reference plane Sr that is parallel with the X axis. At this moment, incident angle α=exit angle β=90°. Height h1 of incident point C1 from reference plane Sr is a height in the Y axis direction from reference plane Sr to incident point C1 of surface C, where height h1=0. In other words, α-β=0°, and to dispose prism 20, a position where incident point C1 of surface C in the Y axis direction is on reference plane Sr is to be the reference.

Subsequently, as shown in FIG. 6B, prism 20 is rotated on the XY plane by rotation angle θ1=20° with end corner point C2 of surface C as a reference point. At this moment, incident angle α=110° and exit angle β=90°. The position of incident point C1 in the Y axis direction moves from reference plane Sr in the +Y axis direction, and height h1 of incident point C1 from reference plane Sr is larger than that of α-β=0° shown in FIG. 6A. Height h2 of emission point B1 from reference plane Sr is a height from reference plane Sr to emission point B1 of surface B in the Y axis direction. At this moment, emission point B1 (positioned at the left end of surface B in FIG. 6B) deviates in the −X axis direction by distance d1 from an axis extended in the Y axis direction with incident point C1 as an origin. At this moment, α-β=20°.

Subsequently, as shown in FIG. 6C, prism 20 is further rotated to make rotation angle θ1=45° on the XY plane with end corner point C2 of surface C as a reference point. At this moment, incident angle α=135° and exit angle β=90°, and height h1 of incident point C1 from reference plane Sr is further larger than that of α-β=20° shown in FIG. 6B. Height h2 of emission point B1 from reference plane Sr is smaller than that of α-β=20° shown in FIG. 6B. That is, the distance (the difference between height h1 and height h2) from incident point C1 to emission point B1 in the Y axis direction is smaller than that of α-β=20° shown in FIG. 6B. Emission point B1 further deviates in the −X axis direction from an axis extended in the Y axis direction with incident point C1 as an origin. Distance d1 is larger than that of α-β=20° shown in FIG. 6B. At this moment, α-β=45°.

Furthermore, as shown in FIG. 6D, prism 20 is further rotated to make rotation angle θ1=60° on the XY plane with end corner point C2 of surface C as a reference point. At this moment, incident angle α=150° and exit angle β=90°, and height h1 of incident point C1 from reference plane Sr is further larger than that of α-β=45° shown in FIG. 6C. Height h2 of emission point B1 from reference plane Sr is further smaller than that of α-β=45° shown in FIG. 6C. That is, the distance from incident point C1 to emission point B1 in the Y axis direction is smaller than that of α-β=45° shown in FIG. 6C. Emission point B1 further deviates in the −X axis direction from an axis extended in the Y axis direction with incident point C1 as an origin. Distance d1 is larger than that of α-β=45° shown in FIG. 6C. At this moment, α-β=60°.

Accordingly, as shown in FIGS. 6B through 6D, disposing prism 20 at incident angle α and exit angle β satisfying the next expression decreases the height of concerned lighting device 10 in the +Y axis direction. This allows concerned lighting device 10 to be slim, namely, to be downsized as compared to a conventional one. Note that distance d1 increases that is a difference in the X axis direction between surface C and illumination light reflected off surface A.

$$20° \le |\alpha - \beta| \le 60°$$

1-1-3. Advantages

In this embodiment, using prism 20 allows the height of lighting device 10 in the Y axis direction to be smaller if 20°≤|α-β|≤60°. This prevents distance d1 (i.e., a difference in the X axis direction) from increasing comparatively, as well as from decreasing the use efficiency of light from lighting device 10 while achieving slimming down and downsizing as compared to a conventional one.

As described above, this embodiment allows lighting device 10 to be downsized without decreasing the use efficiency of light owing to prism 20 having surface A as a reflecting surface.

Second Exemplary Embodiment

Figure 7:
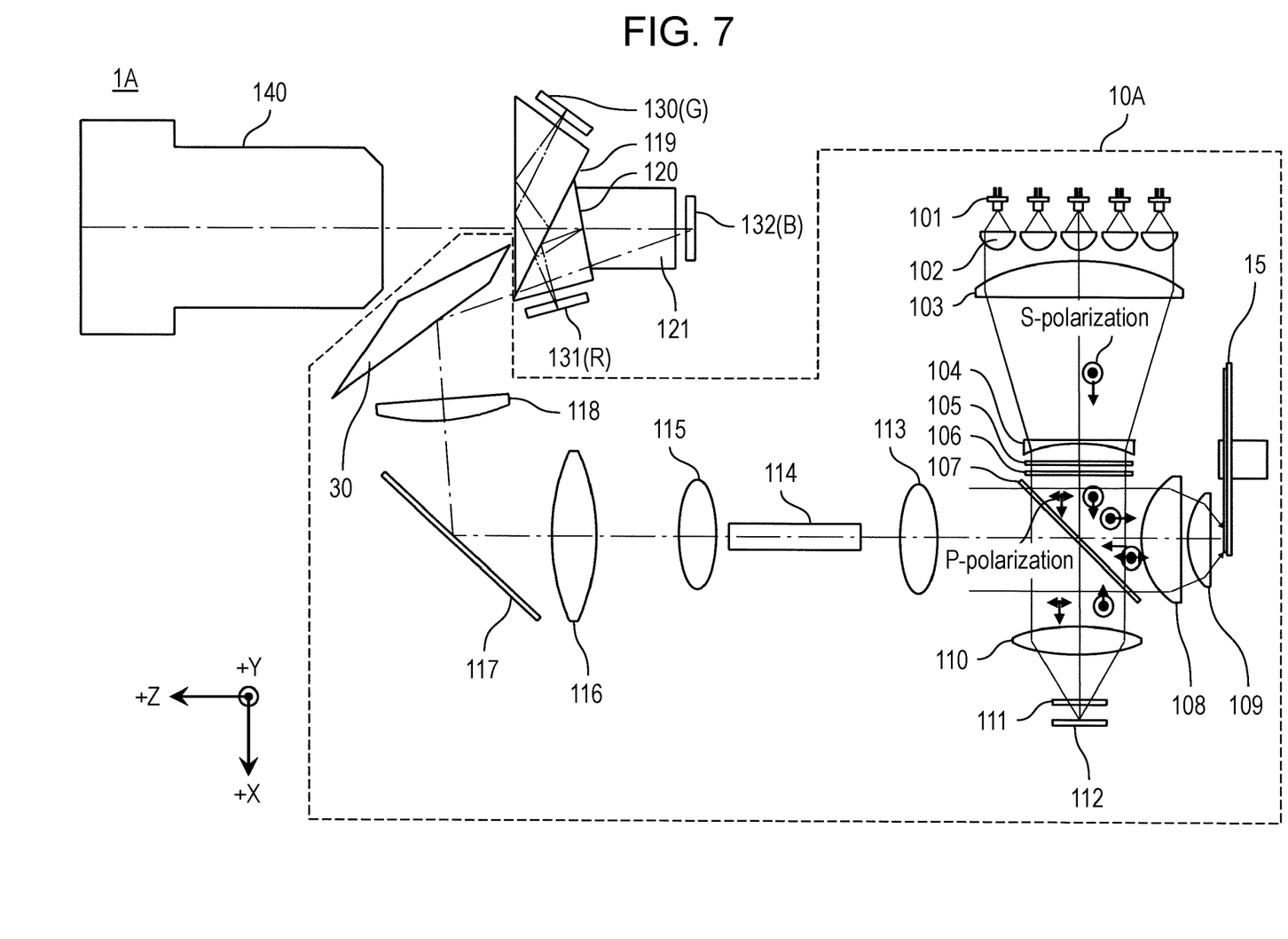
FIG. 7 is a block diagram illustrating an example configuration of projection display apparatus 1A equipped with lighting device 10A of the second exemplary embodiment.

FIG. 7 is a block diagram illustrating an example configuration of projection display apparatus 1A equipped with lighting device 10A of the second exemplary embodiment. In FIG. 7, projection display apparatus 1A of the second embodiment features lighting device 10A instead of lighting device 10 as compared to projection display apparatus 1 in FIG. 1. Here, lighting device 10A features total reflection mirror 30, instead of prism 20, having a similar function as that of prism 20 as shown in FIG. 7, as compared to lighting device 10 in FIG. 1. In other words, the reflecting surface of total reflection mirror 30 corresponds to surface A (i.e., the reflecting surface of prism 20), where the angle of illumination light from lens 118 may be changed using total reflection mirror 30. Herewith, lighting device 10A according to the second embodiment has the same effects and advantages as those of lighting device 10 in FIG. 1.

Other Exemplary Embodiments

Hereinbefore, the description is made of the embodiments for exemplification of the technologies in the disclosure. However, these technologies are not limited to the embodiments, but are also applicable to embodiments that have undergone change, substitution, addition, and/or omission. Besides, some components described above can be combined to create a new embodiment.

What is claimed is:

1. A lighting device comprising:
    a light source device; and
    a reflective component that includes a reflecting surface that reflects an illumination light incident from the light source device at incident angle α and emits the illumination light reflected toward a display element at exit angle β,
    wherein, in a coordinate system in which a first axis, a second axis, and a third axis are orthogonal to each other, the reflecting surface of the reflective component is rotated with respect to the first axis and the second axis, and
    wherein 20 degrees≤|α-β|≤60 degrees is satisfied,
    where each of the incident angle α and the exit angle β is angle of the illumination light to a horizontal direction of the display element when the illumination light is incident on a front surface of the display element.

2. The lighting device of claim 1, wherein the reflective component is a first prism using internal reflection.

3. The lighting device of claim 2,
wherein the reflecting surface of the reflective component is a plane in which a plane parallel with a plane containing the first axis and the third axis is rotated with respect to the first axis and to the second axis by respective given angles,
wherein an exit surface of the reflective component from which the illumination light is emitted is parallel with a plane containing the first axis and the second axis, and
wherein an incident surface of the reflective component that the illumination light enters is a plane in which a plane parallel with a plane containing the first axis and the third axis is rotated with respect to the first axis by a given angle.

4. The lighting device of claim 1, wherein the reflective component is a total reflection mirror.

5. The lighting device of claim 1,
wherein the reflecting surface of the reflective component is a plane in which a plane parallel with a plane containing the first axis and the third axis is rotated with respect to the first axis and to the second axis by respective given angles.

6. A projection display apparatus comprising:
the lighting device of claim 1; and
the display element,
wherein the display element is a light modulation element that modulates the illumination light from the lighting device according to an image signal.

7. The projection display apparatus of claim 6, wherein the light modulation element is a digital micro mirror that reflects the illumination light off a mirror forming respective pixels.

8. The projection display apparatus of claim 6, further comprising a second prism disposed between the reflective component and the display element,
wherein the light modulation element includes a plurality of light modulation element parts each corresponding to a corresponding one of a plurality of given wavelengths, and
wherein the second prism separates the illumination light from the reflective component to illumination lights of the plurality of given wavelengths and emits the illumination lights to a corresponding one of the plurality of light modulation element parts.

* * * * *